(No Model.)
J. F. MILLER.
BURNER FOR CRUDE OILS AND STEAM.
No. 534,612. Patented Feb. 19, 1895.
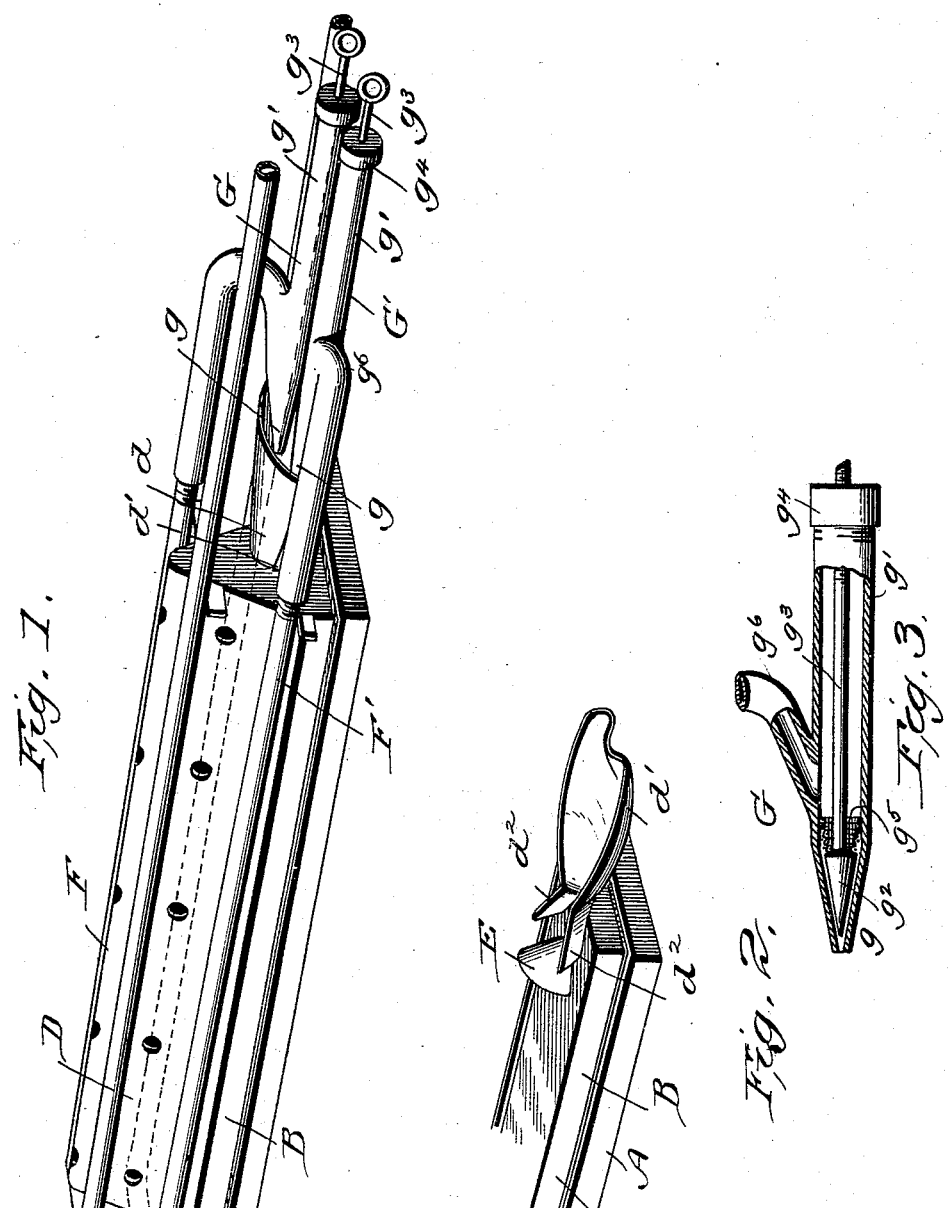

UNITED STATES PATENT OFFICE.

JOHN F. MILLER, OF LAFAYETTE, INDIANA.

BURNER FOR CRUDE OILS AND STEAM.

SPECIFICATION forming part of Letters Patent No. 534,612, dated February 19, 1895.

Application filed August 31, 1893. Serial No. 484,511. (No model.)

*To all whom it may concern:*

Be it known that I, JOHN F. MILLER, a citizen of the United States, residing at Lafayette, in the county of Tippecanoe, State of Indiana, have invented certain new and useful Improvements in Burners for Crude Oils and Steam; and I do hereby declare the following to be a full, clear, and exact description of the invention, such as will enable others skilled in the art to which it appertains to make and use the same.

This invention relates to burners for crude or refined oil and steam; and aims to provide a simple and efficient device for generating the steam and converting the oil into vapor, mixing the steam and vapor with air prior to the entrance of the same into the burner, and preventing to a certain degree the clogging of the small apertures in the nozzles through which the steam and vapor escape to the burner.

The improvement consists of the novel features and the peculiar construction and combination of the parts which will be hereinafter more fully described and claimed and which are shown in the annexed drawings, in which—

Figure 1 is a perspective view of a burner embodying the invention. Fig. 2 is a detail view of the end of the lower portion of the burner provided with the mixing chamber, the upper portion of the burner and mixing chamber being removed. Fig. 3 is a central longitudinal section through the valve for controlling the flow of vapor or gas to the burner.

The burner is designed to be applied to cooking stoves of ordinary construction, the construction being slightly modified to adapt it to the different makes of stoves. The lower portion of the burner is preferably rectangular in shape and comprises a tray A having a raised portion B slightly smaller than the tray so as to form a space C entirely around the said raised portion and between the sides thereof and the vertical sides of the tray A. This raised portion is about flush with the top edges of the side of the tray A and forms a base for the upper portion D of the burner. This upper portion D has the form of an inverted V and is closed at its ends, the crest and sides being perforated for the flame.

A mixing chamber is provided at one end of the burner for the purpose of reheating the steam, gas and air before passing into the burner and has the shape of a flattened egg, being composed of an upper part $d$ and a lower part $d'$, each carried by the respective parts of the burner. The lower part $d'$ is formed with a central raised portion, thus providing two depressions, one on each side, which depressions are intended to receive the ends of valve tubes presently described. The portion $d'$ is also provided at the inner end with flaring wings $d^2$.

A spreader E is located at the inner ends of the flaring wings $d^2$ and is attached to the raised portion B. This spreader inclines upwardly and outwardly from the plane of the raised portion B and is designed to break the force of the gases and cause the same to be distributed uniformly throughout the burner. The upper and lower parts $d$ have their outer or butt ends cut off and the smaller ends terminating in a plane corresponding with the inner ends of the flaring wings $d^2$.

The pipe F is constructed to embrace the sides of the burner so as to be heated thereby and is provided at its delivery end with a valve G, the latter having a curved portion $g^6$ which terminates in a nozzle $g$, and having a straight portion $g'$ in line with the aperture of the nozzle $g$. The aperture in the nozzle $g$ is comparatively smaller and is closed by a plug $g^2$ attached to the inner end of a stem $g^3$ passing through a plug $g^4$ screwed on the outer ends of the threaded portion $g'$. A conical shaped screen $g^5$ is attached to the inner end of the stem $g^3$ and prevents foreign matter from choking up the aperture in the nozzle $g$. A pipe F' of similar construction to the pipe F embraces the sides of the burner and is provided at its delivery end with a valve G' similar in construction to the valve G. One of these pipes is supplied with water which is converted into steam by heat from the burner, and the other with the crude or refined oil to be vaporized for supplying the burner with the requisite gas to be consumed for heating purposes.

The valves G and G' are relatively disposed so that the gas and vapor emerging therefrom will cross within the mixing chamber so as to thoroughly commingle. The outer or butt end of the mixing chamber being open sufficient air is drawn into the mixing chamber to properly temper the vapor and steam to produce a mixture which will produce a perfect combustion when burned.

The manner of supplying the oil and water to the pipes is immaterial and the pressure obtained by the vaporizing of the said water and oil in the pipe is sufficient to force the said vapors through the nozzles into the mixing chamber where it is again heated the mixer being placed on the inside of stove and from thence into the burner where the mixture of gas, steam and air is burned in the usual manner.

Having thus described my invention, what I claim, and desire to secure by Letters Patent, is—

1. The combination with a burner comprising the upper and lower sections, of the mixing chamber comprising also the upper and lower portions connected, respectively, with the upper and lower sections of the burner, the lower portion of the mixer having flaring wings $d^2$ and the depressions $d'$, and a cone shaped spreader E arranged within the burner, in front of the flaring wings $d^2$, and the pipes adapted to enter said mixing chamber, substantially as shown and described.

2. The combination with a pipe having a contracted nozzle, of the pointed valve arranged to close said nozzle, the valve stem and a wire screen surrounding the stem adjacent to the head substantially as shown and described.

In testimony whereof I affix my signature in presence of two witnesses.

JOHN F. MILLER.

Witnesses:
JOS. W. WILSTACH,
THOS. BOWERS.